United States Patent
Higdon

(10) Patent No.: US 9,142,847 B2
(45) Date of Patent: Sep. 22, 2015

(54) FUEL CELL LOAD CONTROLLER

(75) Inventor: David Higdon, Sunnyvale, CA (US)

(73) Assignee: BLOOM ENERGY CORPORATION, Sunnyvale, CA (US)

(*) Notice: Subject to any disclaimer, the term of this patent is extended or adjusted under 35 U.S.C. 154(b) by 1153 days.

(21) Appl. No.: 12/457,982

(22) Filed: Jun. 26, 2009

(65) Prior Publication Data

US 2010/0009220 A1 Jan. 14, 2010

Related U.S. Application Data

(60) Provisional application No. 61/129,623, filed on Jul. 8, 2008.

(51) Int. Cl.
*H01M 8/04* (2006.01)

(52) U.S. Cl.
CPC ........ *H01M 8/04365* (2013.01); *H01M 8/0438* (2013.01); *H01M 8/0494* (2013.01); *H01M 8/04537* (2013.01); *Y02E 60/50* (2013.01)

(58) Field of Classification Search
CPC .......... H01M 8/04365; H01M 8/0438; H01M 8/0494; H01M 8/04537
USPC .......................................... 429/430, 431, 432
See application file for complete search history.

(56) References Cited

U.S. PATENT DOCUMENTS

| | | | |
|---|---|---|---|
| 2004/0028968 A1* | 2/2004 | Okamoto | 429/23 |
| 2004/0166382 A1* | 8/2004 | Grubb et al. | 429/13 |
| 2007/0287043 A1* | 12/2007 | Marsh et al. | 429/23 |
| 2008/0278968 A1 | 11/2008 | Srinivasan et al. | |
| 2008/0280175 A1 | 11/2008 | Gurunathan et al. | |

* cited by examiner

*Primary Examiner* — Ula C Ruddock
*Assistant Examiner* — Frank Chernow
(74) *Attorney, Agent, or Firm* — The Marbury Law Group PLLC

(57) ABSTRACT

A method for distributing power includes identifying a value of a variable in a fuel cell system, where the fuel cell system is configured to provide electrical power to a load. Based at least in part on the identified value of the variable, it is determined that the variable has exceeded a threshold. A first portion of the electrical power is determined for use in correcting the variable, and the first portion of the electrical power is used to correct the variable.

2 Claims, 3 Drawing Sheets

FUEL CELL LOAD CONTROLLER

CROSS-REFERENCE TO RELATED PATENT APPLICATIONS

The present application claims benefit of U.S. provisional application 61/129,623, filed Jul. 8, 2008, which is incorporated herein by reference in its entirety.

FIELD

The subject of the disclosure relates generally to a fuel cell load controller. More specifically, the disclosure relates to a system, method, and computer-readable medium for intelligently and accurately controlling power provided to a fuel cell load such that one or more fuel cell system variables are maintained.

BACKGROUND

Fuel cell systems can be used to provide electrical power to external loads such as buildings, appliances, lights, tools, air conditioners, heating units, factory equipment and machinery, power storage units, computers, security systems, electric grids, etc. In addition to providing power to external loads, the electricity produced by a fuel cell system can also be used internally by the fuel cell system. For example, the electricity produced by the fuel cell system can be used to maintain fuel cell system variables such as temperature, fuel flow rate, pressure, etc. Electricity produced by the fuel cell system can also be used to power auxiliary devices, control units, startup devices, monitoring devices, etc. utilized by the fuel cell system. As an example, auxiliary fans and/or blowers may be used to remove heat from a fuel cell system such that a temperature threshold is not exceeded.

SUMMARY

An exemplary method for distributing power includes identifying a value of a variable in a fuel cell system, where the fuel cell system is configured to provide electrical power to a load. Based at least in part on the identified value of the variable, it is determined that the variable has exceeded a threshold. A first portion of the electrical power is determined for use in correcting the variable, and the first portion of the electrical power is used to correct the variable.

An exemplary system for distributing power includes a fuel cell system, a controller, and a combiner. The fuel cell system is configured to provide electrical power to a load. The controller is configured to determine, based on an identified value of a variable associated with the fuel cell system, that the variable has exceeded a threshold. The controller is also configured to determine a first portion of the electrical power for use in correcting the variable. The combiner is configured to determine a second portion of the electrical power for provision to the load. The second portion of the electrical power is based at least in part on the first portion of the electrical power and a load setpoint.

An exemplary computer-readable medium has computer-readable instructions stored thereon. Upon execution by a processor, the computer-readable instructions cause the processor to identify a value of a variable in a fuel cell system. The fuel cell system is configured to provide electrical power to a load. The computer-readable instructions also cause the processor to determine, based at least in part on the identified value of the variable, that the variable has exceeded a threshold. The computer-readable instructions also cause the processor to determine a first portion of the electrical power for use in correcting the variable. The computer-readable instructions further cause the processor to distribute the first portion of the electrical power to correct the variable.

Another exemplary system for distributing power includes means for identifying a value of a variable in a fuel cell system, where the fuel cell system is configured to provide electrical power to a load. The system also includes means for determining, based at least in part on the identified value of the variable, that the variable has exceeded a threshold. The system also includes means for determining a first portion of the electrical power for use in correcting the variable. The system further includes means for using the first portion of the electrical power to correct the variable.

Other principal features and advantages will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

DETAILED DESCRIPTION

In a traditional fuel cell system, a majority of the generated electricity is provided to one or more external loads. As a result, the fuel cell system may not have enough power to continually maintain internal fuel cell system variables. Failure to maintain internal fuel cell system variables can lead to decreased efficiency and/or deterioration of the fuel cell system. The inventor has perceived that traditional fuel cell systems are limited by their inability to efficiently allocate generated power between one or more external loads and one or more internal variables. The inventor has also perceived that traditional fuel cell systems are limited by their inability to minimize the amount of power removed from an external load such that an internal variable is maintained.

Figure 1:
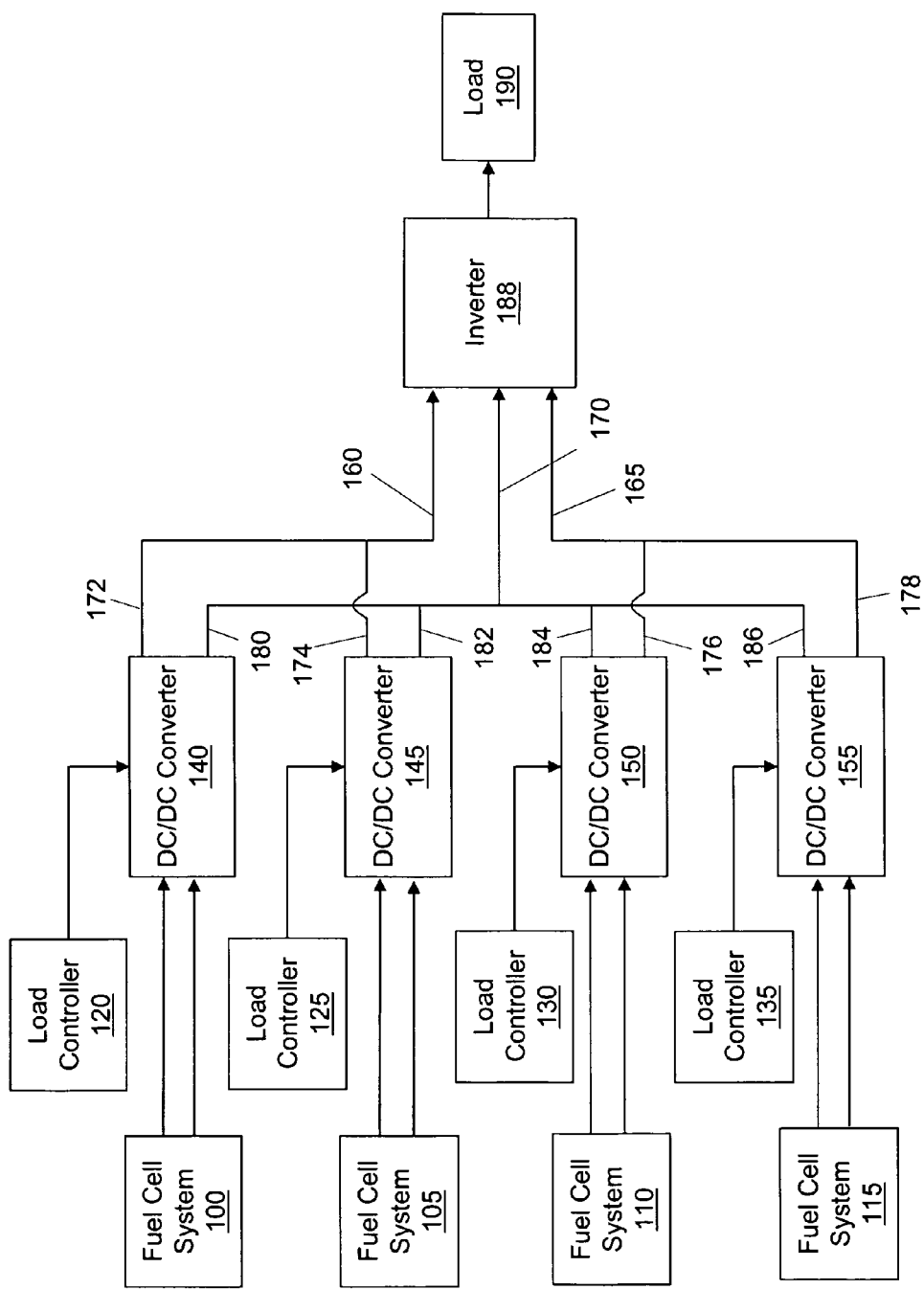
FIG. 1 is a block diagram illustrating a power supply system with load control in accordance with an exemplary embodiment.

FIG. 1 is a block diagram illustrating a power supply system with load control in accordance with an exemplary embodiment. The power supply system includes a first fuel cell system 100, a second fuel cell system 105, a third fuel cell system 110, and a fourth fuel cell system 115. In alternative embodiments, fewer or additional fuel cell systems can be included in the system. In an exemplary embodiment, a fuel cell system can include one or more fuel cell columns, each of which may contain one or more fuel cell stacks, such as solid oxide fuel cell stacks. A fuel cell stack can refer to a plurality of individual fuel cells which are electrically connected in series. Alternatively, a fuel cell system can refer to a single fuel cell stack. The number of individual fuel cells which make up a given fuel cell system can depend on the amount of electrical power which the given fuel cell system is intended to generate. In alternative embodiments, fuel cell systems 100, 105, 110, and 115 can include any other configuration, arrangement, and/or number of individual fuel cells, and may be arranged in a modular configuration, where the power supply system is comprised of separate fuel cell modules or systems and associated power conditioning module and fuel pre-processing module. An exemplary fuel cell system is described in U.S. patent application Ser. No. 11/797,707 (filed May 7, 2007 and entitled Ripple Cancellation), the disclosure of which is incorporated herein by reference in its entirety.

Fuel cell systems 100, 105, 110, and 115 can produce a direct current (DC) as known to those of skill in the art. The amount of direct current produced by fuel cell system 100 may be based on load demand and/or power available from a grid (not shown) in communication with the system. Fuel cell system 100 is in electrical communication with a DC/DC converter 140. As used herein, electrical communication can refer to any direct or indirect electrical connection. DC/DC converter 140 can be used to increase (i.e., boost) the voltage of the DC signal received from fuel cell system 100. Similarly, fuel cell system 105 is in electrical communication with a DC/DC converter 145, fuel cell system 110 is in electrical communication with a DC/DC converter 150, and fuel cell system 115 is in electrical communication with a DC/DC converter 155. In an alternative embodiment, DC/DC converters 140, 145, 150, and 155 may be used to decrease the voltage of the DC signals produced by fuel cell systems 100, 105, 110, and 115. In another alternative embodiment, DC/DC converters 140, 145, 150, and 155 may not be used.

As illustrated in FIG. 1, DC/DC converter 140 is in electrical communication with a load controller 120, DC/DC converter 145 is in electrical communication with a load controller 125, DC/DC converter 150 is in electrical communication with a load controller 130, and DC/DC converter 155 is in electrical communication with a load controller 135. Load controllers 120, 125, 130, and 135 can be used to monitor internal fuel cell system variables. Based on the monitoring, load controllers 120, 125, 130, and 135 can control the amount of power provided to a load 190 by fuel cell systems 100, 105, 110, and 115. Load controllers 120, 125, 130, and 135 can be implemented using hardware and/or software, depending on the embodiment.

In an exemplary embodiment, load controller 120 can be used to control the amount of power provided from fuel cell system 100 to load 190. The amount of power provided to load 190 can be based in part on the value(s) of internal fuel cell system variables. For example, load controller 120 can be used to monitor a temperature of fuel cell system 100. If the temperature exceeds a predetermined threshold, load controller 120 can cause at least a portion of the power generated by fuel cell system 100 to be used for powering an auxiliary fan. The auxiliary fan can be used to lower the temperature of fuel cell system 100. Alternatively, other temperature control may be used, such as by varying the inlet fuel flow to the fuel cell stacks and/or by changing the amount of current drawn from the stacks. As the temperature of fuel cell system 100 moves toward an acceptable value, load controller 120 can continually adjust the amount of power provided to load 190 and the amount of power used to correct the temperature. As a result, an optimal amount of power is continually utilized until the temperature is corrected, and load controller 120 does not overcompensate in the event of a problematic variable.

In one embodiment, load controllers 120, 125, 130, and 135 can provide commands to DC/DC converters 140, 145, 150, and 155, respectively. For example, load controller 120 may determine that 15% of the power generated by fuel cell system 100 is to be utilized to correct an internal variable, and that 85% of the power generated by fuel cell system 100 is to be provided to load 190. As such, load controller 120 can provide a command to DC/DC converter 140 such that 85% of the power is directed to load 190 and 15% of the power is directed to correct the internal variable. The 15% of power used to correct the internal variable may be provided through DC/DC converter 140, or directly from fuel cell system 100, depending on the embodiment. Load controller 125 may command DC/DC converter 145 to direct 93% of the power generated by fuel cell system 105 to load 190 and 7% to correct an internal variable. Load controller 130 may command DC/DC converter 150 to direct 100% of the available power generated by fuel cell system 110 to load 190. In alternative embodiments, load controllers 120, 125, 130, and 135 may be in direct communication with fuel cell systems 100, 105, 110, and 115, respectively.

In one embodiment, each of load controllers 120, 125, 130, and 135 may monitor different variables. For example, load controller 120 may monitor a first temperature variable and a first pressure variable corresponding to fuel cell system 100, and load controller 125 may monitor a second temperature variable and a second pressure variable corresponding to fuel cell system 105. As such, load controller 120 can distribute the power generated by fuel cell system 100 to maintain the first temperature variable and the first pressure variable. Similarly, load controller 125 can distribute the power generated by fuel cell system 105 to maintain the second temperature variable and the second pressure variable. Alternatively, each of load controllers 120, 125, 130, and 135 may work in unison to monitor the same or overlapping variables. For example, load controllers 120, 125, 130, and 135 may all monitor an overall temperature of the system formed by fuel cell systems 100, 105, 110, and 115. If the overall temperature exceeds a predetermined temperature threshold, load controllers 120, 125, 130, and 135 can work in unison to redistribute the power generated by fuel cell systems 100, 105, 110, and 115 such that the overall temperature is corrected. An exemplary load controller is described in more detail with reference to FIG. 2.

As illustrated in FIG. 1, positive and negative outputs of the DC/DC converters 140, 145, 150, and 155 optionally are combined to form a spit bus. The split bus includes a positive bus 160, a negative bus 165, and a neutral bus 170. Positive bus 160 is formed with a positive output 172 from DC/DC converter 140 and a positive output 174 from DC/DC converter 145. Negative bus 165 is formed with a negative output 176 from DC/DC converter 150 and a negative output 178 from DC/DC converter 155. Neutral bus 170 is formed with a negative output 180 from DC/DC converter 140, a negative output 182 from DC/DC converter 145, a positive output 184 from DC/DC converter 150, and a positive output 186 from DC/DC converter 155 (such that the positive and negative outputs combine to form a neutral output for neutral bus 170). In alternative embodiments, the split bus may be formed by any other combinations of the outputs of DC/DC converters 140, 145, 150, and 155. In one embodiment, the split bus configuration described in U.S. application Ser. No. 11/797,707, filed on May 7, 2007 and incorporated herein by reference in its entirety may be used. In another alternative embodiment, a split bus configuration may not be used.

Positive bus 160, negative bus 165, and neutral bus 170 are in electrical communication with an inverter 188. Inverter 188 can be any electrical device configured to receive a direct current and convert the received direct current into an alternating current. Inverter 188 is in electrical communication with load 190 for providing an AC signal to load 190. In an exemplary embodiment, the AC signal from inverter 188 to load 190 can be a three-phase AC signal. Alternatively, any other AC signal may be used. Load 190 can be an external load such as a building, an appliance, an air conditioner, a heating unit, a computer, a security system, etc. Load 190 may also be an electrical grid to which electrical power is being provided by the power system. In an alternative embodiment, load 190 may be a DC load, and inverter 188 may not be used.

Figure 2:
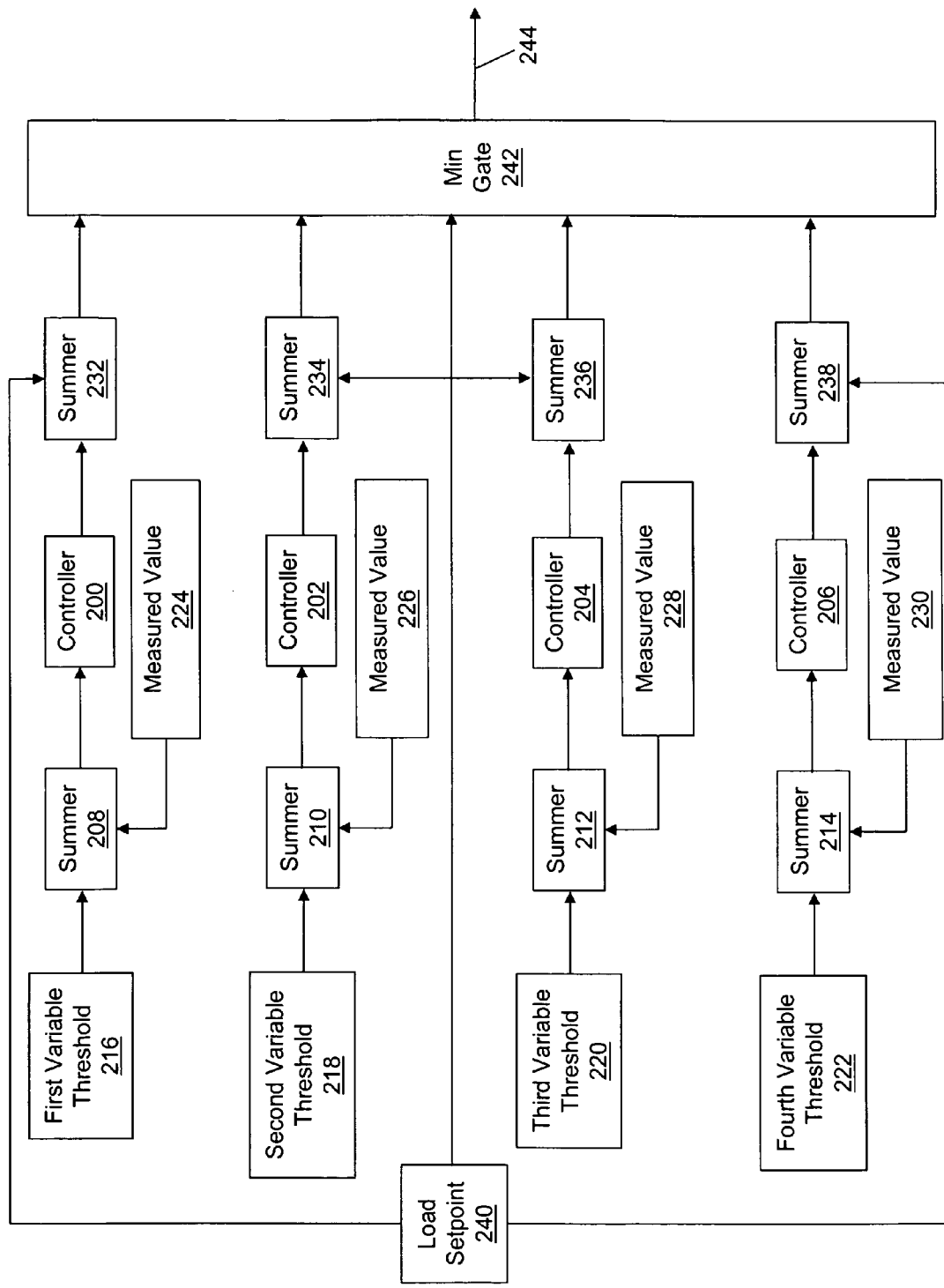
FIG. 2 is a block diagram illustrating a load controller in accordance with an exemplary embodiment.

FIG. 2 is a block diagram illustrating a load controller in accordance with an exemplary embodiment. The load controller can be used to maintain a first variable, a second variable, a third variable, and a fourth variable associated with one or more fuel cell systems. In alternative embodiments, the load controller may be used to maintain fewer or additional variables. The variables can include one or more temperatures associated with the fuel cell system(s), one or more pressures associated with the fuel cell system(s), one or more flow rates associated with the fuel cell system(s), one or more desired voltages (such as a fuel cell module voltage and/or a fuel cell bus voltage, where a fuel cell module contains plural fuel cell stacks, columns or segments), one or more desired currents, etc.

The load controller includes a controller 200 associated with the first variable, a controller 202 associated with the second variable, a controller 204 associated with the third variable, and a controller 206 associated with the fourth variable. In alternative embodiments, additional or fewer controllers may be used. In an exemplary embodiment, controllers 200, 202, 204, and 206 can be proportional-integral-derivative (PID) controllers as known to those of skill in the art. Alternatively, any other type(s) of controllers may be used. For example, controllers 200, 202, 204, and 206 may be proportional-integral (PI) controllers, proportional-derivative (PD) controllers, proportional (P) controllers, integral (I) controllers, etc. Controllers 200, 202, 204, and 206 can be implemented in hardware and/or software, depending on the embodiment.

Controller 200 receives a signal from a summer 208 associated with the first variable. Summer 208, which can be any type of summer or combiner known to those of skill in the art, can be used to combine a first variable threshold 216 and a measured value 224 of the first variable. Measured value 224 of the first variable can be received from a measuring instrument (not shown). First variable threshold 216 can be a desired limit of the first variable. First variable threshold 216 may also be a range of acceptable values for the first variable. In an exemplary embodiment, summer 208 can combine the opposite of measured value 224 with first variable threshold 216 (or the opposite of first variable threshold 216 with measured value 224) to determine the difference (or error) between measured value 224 and first variable threshold 216. This error is provided to controller 200. In an exemplary embodiment, the error may be provided to controller 200 only if first variable threshold 216 is exceeded.

Controller 200 can determine whether to redistribute power generated by the fuel cell system based at least in part on the input received from summer 208. For example, if controller 200 is a PID controller, the error between measured value 224 and first variable threshold 216 can be subjected to a proportional operation using a gain $K_p$, an integral operation using a gain $K_i$, and/or a derivative operation using a gain $k_d$. The proportional operation can be used to determine an appropriate redistribution of power based on the current error, the integral operation can be used to determine an appropriate redistribution of power based on the sum of recent errors, and the derivative operation can be used to determine an appropriate redistribution of power based on the rate at which the error is changing. The results of the proportional operation, the integral operation, and the derivative operation can be combined such that an output is generated.

The redistribution of power can be an increase in power to the load or a decrease in power to the load, depending on the measured values of the variables. For example, if a variable threshold is exceeded, the system can determine that power to the load should be reduced and that at least a portion of the reduced power should be utilized to correct the variable. As the variable is corrected, the system can continually monitor the variable and redistribute the power accordingly. As a result, the system continually optimizes the distribution of power and does not overcompensate in the event of a problematic variable. In an exemplary embodiment, the values used for gain $K_p$, gain $K_i$, and/or gain $K_d$ may be based on the error. For example, a larger value of $K_i$ may be used during reduction of power to the load (i.e., in the event of a problematic variable) and a smaller value of $K_i$ may be used if the power to the load is being increased. Further, $k_p$ may be used only during reduction of the power to the load. As a result, the rate at which power to the load is reduced can be greater than the rate at which power to the load is re-applied.

In an exemplary embodiment, the output of controller 200 can be an amount by which power being provided to the load from the fuel cell system should be altered such that the first variable can be maintained. The output of controller 200 is provided to a summer 232. Summer 232 can be used to combine the output of controller 200 and a load setpoint 240. Load setpoint 240 can be a current, voltage, power, etc. value which the fuel cell system provides to the load under normal operating conditions such that the load is satisfied. In one embodiment, the output of controller 200 can be zero or a negative value having an absolute value less that or equal to load setpoint 240. The output of summer 232 is the amount of power which can be provided to the load so that the first variable is maintained.

The second, third, and fourth variables can be similarly monitored and maintained. With respect to the second variable, summer 210 can be used to combine a second variable threshold 218 and a measured value 226 of the second variable to determine an error of the second variable. Controller 202 can be used to determine an amount by which the power being provided to the load should be altered such that the second variable can be maintained. An output of summer 234 can be the amount of power which can be provided to the load so that the second variable is maintained. With respect to the third variable, summer 212 can be used to combine a third variable threshold 220 and a measured value 228 of the third variable to determine an error of the third variable. Controller 204 can be used to determine an amount by which the power being provided to the load should be altered such that the third variable can be maintained. An output of summer 236 can be the amount of power which can be provided to the load so that the third variable is maintained. With respect to the fourth variable, summer 214 can be used to combine a fourth variable threshold 222 and a measured value 230 of the fourth variable to determine an error of the fourth variable. Controller 206 can be used to determine an amount by which the power being provided to the load should be altered such that the fourth variable can be maintained. An output of summer 238 can be the amount of power which can be provided to the load so that the fourth variable is maintained.

The output of summers 232, 234, 236, and 238 are provided to a min gate 242. Alternatively, any other type of selector may be used. Min gate 242 can be used to select the lowest of the outputs from summers 232, 234, 236, and 238. In other words, min gate 242 can be used to identify the output corresponding to the least amount of power provided to the load. For example, the output from summer 232 may indicate that 95% of load setpoint 240 should be provided to the load, the outputs from summer 234 and summer 236 may indicate that 100% of load setpoint 240 should be provided to the load (i.e., normal operating condition of the second and third variables), and the output from summer 238 may indicate that 90% of load setpoint 240 should be provided to the load. Min gate 242 can be configured to select the output from summer 238, which corresponds to the least power being provided to the load. As a result, the system ensures that all four variables can be simultaneously maintained. This lowest output from min gate 242 can be provided as a control signal 244 to a DC/DC converter (such as converter 140) as described with reference to FIG. 1. Alternatively, control signal 244 may be provided directly to the fuel cell system.

Figure 3:
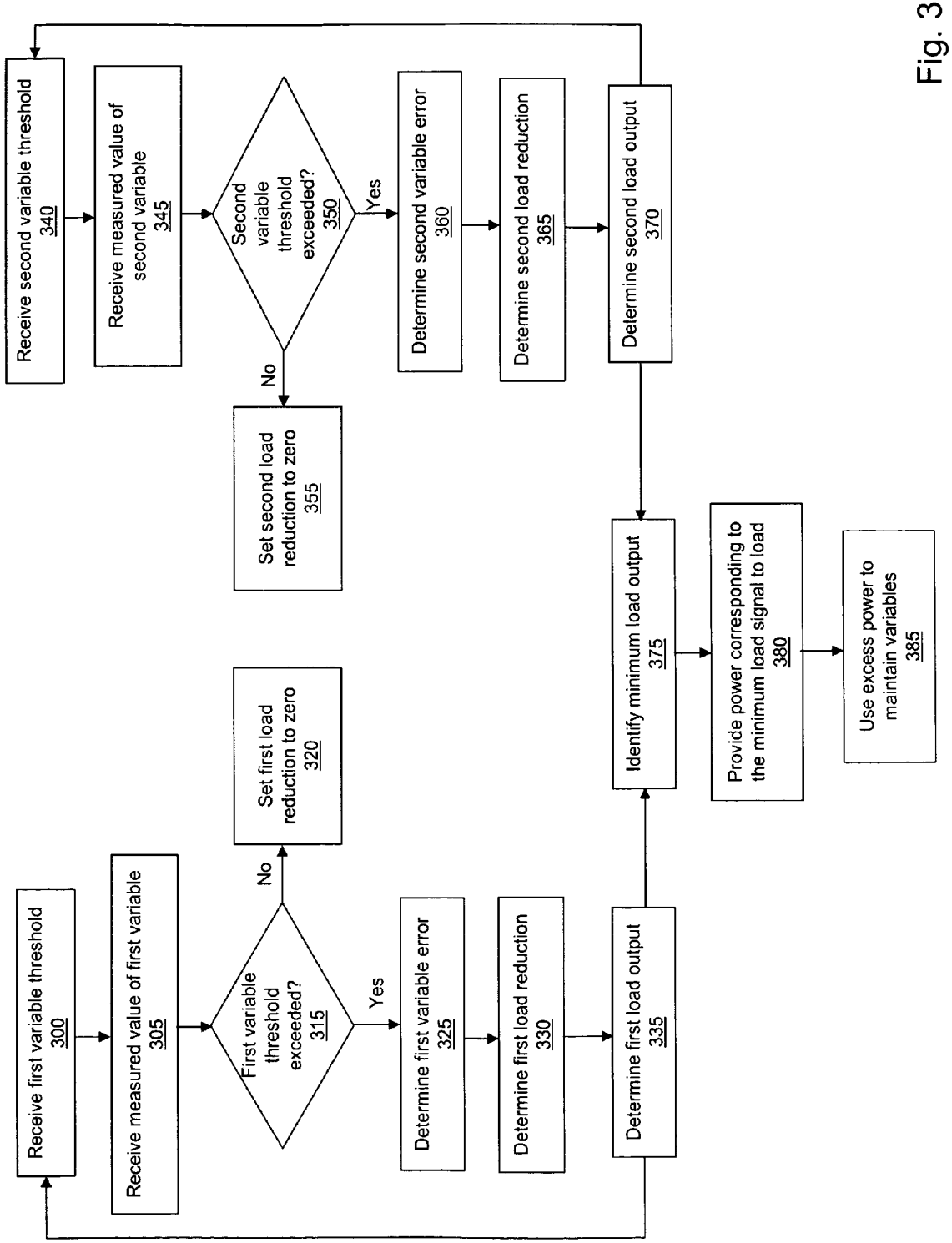
FIG. 3 is a flow diagram illustrating operations performed by a power supply system in accordance with an exemplary embodiment.

FIG. 3 is a flow diagram illustrating operations performed by a power supply system in accordance with an exemplary embodiment. In alternative embodiments, additional, fewer, and/or different operations may be performed. FIG. 3 is directed toward the scenario in which the amount of power provided to the load is reduced or ramped down in response to an exceeded variable threshold. In such a scenario, a reduction integral gain of $K_i$ and a proportional gain of $K_p$ can be used by the PID controller. The scenario in which the amount of power provided to the load is increased or ramped up (i.e., as the system recovers) is described in more detail below. FIG. 3 is described with reference to maintaining two variables. However, it is important to understand that the systems described herein can be used to maintain any number of variables. In an operation 300, a first variable threshold is received. As an example, the first variable may be an internal temperature of the fuel cell system, and the first variable threshold may be x degrees, where x can be any value based on the desired operating temperature of the fuel cell system. In an operation 305, a measured value of the first variable is received. In the example above, the measured value of the temperature may be received from a thermometer, temperature probe, thermocouple, or other temperature measurement device.

In an operation 315, a determination is made regarding whether the first variable threshold has been exceeded by comparing the measured value of the first variable to the first variable threshold. If the first variable threshold is not exceeded (i.e., the measured value of the first variable is equal to the first variable threshold), a first load reduction signal is set to zero in an operation 320. In an exemplary embodiment, a load reduction of zero can correspond to a normal operating condition in which the first variable is operating within acceptable limits. If the first variable threshold is exceeded such that the amount of power provided to the load is to be reduced, a first variable error is determined in an operation 325. The first variable error can be the amount by which the first variable threshold is exceeded. For example, if the first variable threshold is a temperature of 800° C. and the measured temperature is 820° C., the first variable error can be 20° C.

In an operation 330, a first load reduction is determined. The first load reduction can be the amount by which the power provided to the load should be reduced such that the first variable can be corrected by the fuel cell system. If the first variable threshold is not exceeded, the first load reduction can be zero as described above with reference to operation 320. In an exemplary embodiment, the first load reduction can be determined by a PID controller as described with reference to FIG. 2. Alternatively, the first load reduction may be determined using any other type of controller and/or any other method(s). In another exemplary embodiment, the maximum value of the first load reduction can be zero, and the minimum value of the first load reduction can be the opposite of the load setpoint. The first load reduction can be calculated to maximize the amount of power being provided to the load, while still providing the fuel cell system with enough power to correct the first variable. As such, the system does not overcompensate in the event of a problem.

In an operation 335, a first load output is determined. The first load output can be the maximum amount of power, voltage, current, etc. which the fuel cell system can provide to the load based on the state of the first variable. In an exemplary embodiment, the first load output can be determined by combining a load setpoint and the first load reduction. As such, if the first load reduction is zero (i.e., normal operating condition with reference to the first variable), the first load output can be the load setpoint. If the first load reduction is a negative value equal to the opposite of the load setpoint, the first load output can be zero. As a result, all of the power generated by the fuel cell can be used to correct the first variable. If the first load reduction is a value somewhere between zero and the opposite of the load setpoint, a first portion of the power generated by the fuel cell can be used to correct the first variable, and a second portion of the power generated by the fuel cell may be provided to the load, depending on the status of other variables.

In operations 340-370, the process described above in operations 300-335 is performed with respect to a second variable. Specifically, in an operation 340, a second variable threshold is received. In an operation 345, a measured value of the second variable is received. In an operation 350, a determination is made regarding whether the second variable threshold is exceeded. If the second variable threshold is not exceeded, a second load reduction is set to zero in an operation 355. If the second variable threshold is exceeded such that the amount of power provided to the load is to be reduced, a second variable error is determined in an operation 360. In an operation 365, the second load reduction is determined, and a second load output is determined in an operation 370.

In an operation 375, a minimum load output is identified. With reference to FIG. 3, the minimum load output can be the lesser of the first load output and the second load output. In alternative embodiments in which more than two variables are monitored, the minimum load output can be the least of n load outputs, where n is any value corresponding to the number of variables being monitored and controlled. In an operation 380, power corresponding to the minimum load output is provided to the load. The power can be provided through a DC/DC converter using a split bus configuration as described above. Alternatively, the power may be provided to the load using any other method. In an operation 385, excess power is used to maintain the first variable and/or the second variable.

As indicated by the arrow between operation 335 and operation 300 and the arrow between operation 370 and operation 340, the process can be continually repeated during operation of the fuel cell system. As a result, the power distribution can continually be adjusted to optimize efficiency and performance. As an example based on FIG. 3, the first variable can be an internal temperature of the fuel cell system, and the second variable can be an internal pressure. During a first iteration of operations 300-370, it may be determined that the temperature is acceptable but that the internal pressure is in excess of an internal pressure threshold. It may further be determined that 10% of the operating power should be utilized to correct the internal pressure. As a result, the first load output can correspond to 100% of the load setpoint and the second load output can correspond to 90% of the load setpoint. The minimum load output (i.e., the second load output) can be identified, and 90% of the generated power can be provided to the load. The other 10% of the generated power can be used to correct the pressure. The process of reducing the amount of power provided to the load may take several iterations depending on the values of the reduction integral gain $K_i$ and the proportional gain $K_p$ used by the PID controller.

During a subsequent iteration of operations 300-370, it may again be determined that the internal temperature is acceptable. It may also be determined that the internal pressure has improved, but is still in excess of the threshold. As such, the system may determine that 8% of the operating power should be utilized to correct the internal pressure. The minimum load output can be identified as 92% of the generated power, and 8% of the generated power can be used to correct the internal pressure. In such a scenario, the system can use the PID controller to incrementally increase (or ramp up) the amount of power provided to the load. During ramp up, the PID controller can utilize a recovering integral gain $K_i$ and a proportional gain $K_p$ of zero. In an exemplary embodiment, the recovering integral gain $K_i$ can be approximately ½ of the magnitude of the reduction integral gain $K_i$ used to decrease the amount of power provided to the load. As a result, ramping up power to the load can be done more slowly than ramping down power to the load. Ramping up slowly can help protect the fuel cells, which may be sensitive because they are too hot, too cold, wet, using poor quality fuel, etc. The iterations performed by the system can be periodic or continuous, depending on the embodiment. During an nth iteration, it may be determined that both the internal temperature and the internal pressure are operating within their respective thresholds. As such, 100% of the generated power can again be provided to the load.

The systems described herein can be implemented with hardware and/or software (or logic), depending on the embodiment. The systems described herein can also be implemented as a digital computer processor or an analog controller, depending on the embodiment. In one embodiment, the system can be implemented at least in part as instructions stored in a computer-readable medium. Upon execution of the instructions by a processor, the instructions can cause the processor to perform operations of a fuel cell load controller.

One or more flow diagrams have been used herein. The use of flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for distributing power, the method comprising:
    identifying a value of a variable in a fuel cell system, wherein the fuel cell system is configured to provide electrical power to a load, and wherein the variable comprises a fuel cell system voltage;
    determining, based at least in part on the identified value of the variable, that the variable has exceeded a threshold;
    determining a first portion of the electrical power for use in correcting the variable;
    using the first portion of the electrical power to directly correct the variable by varying a current provided by the fuel cell system to the load to correct the fuel cell system voltage; and
    providing a second portion of the electrical power to the load, wherein the second portion of the electrical power is based at least in part on the first portion of the electrical power and at least in part on a load setpoint.

2. The method of claim 1, wherein the first portion of the electrical power is configured to maximize an amount of the electrical power provided to the load while providing the fuel cell system with enough power to correct the first variable.

* * * * *